Aug. 28, 1956  H. L. MORRILL, JR  2,760,294
FISH LURE
Filed Sept. 22, 1954  2 Sheets-Sheet 1
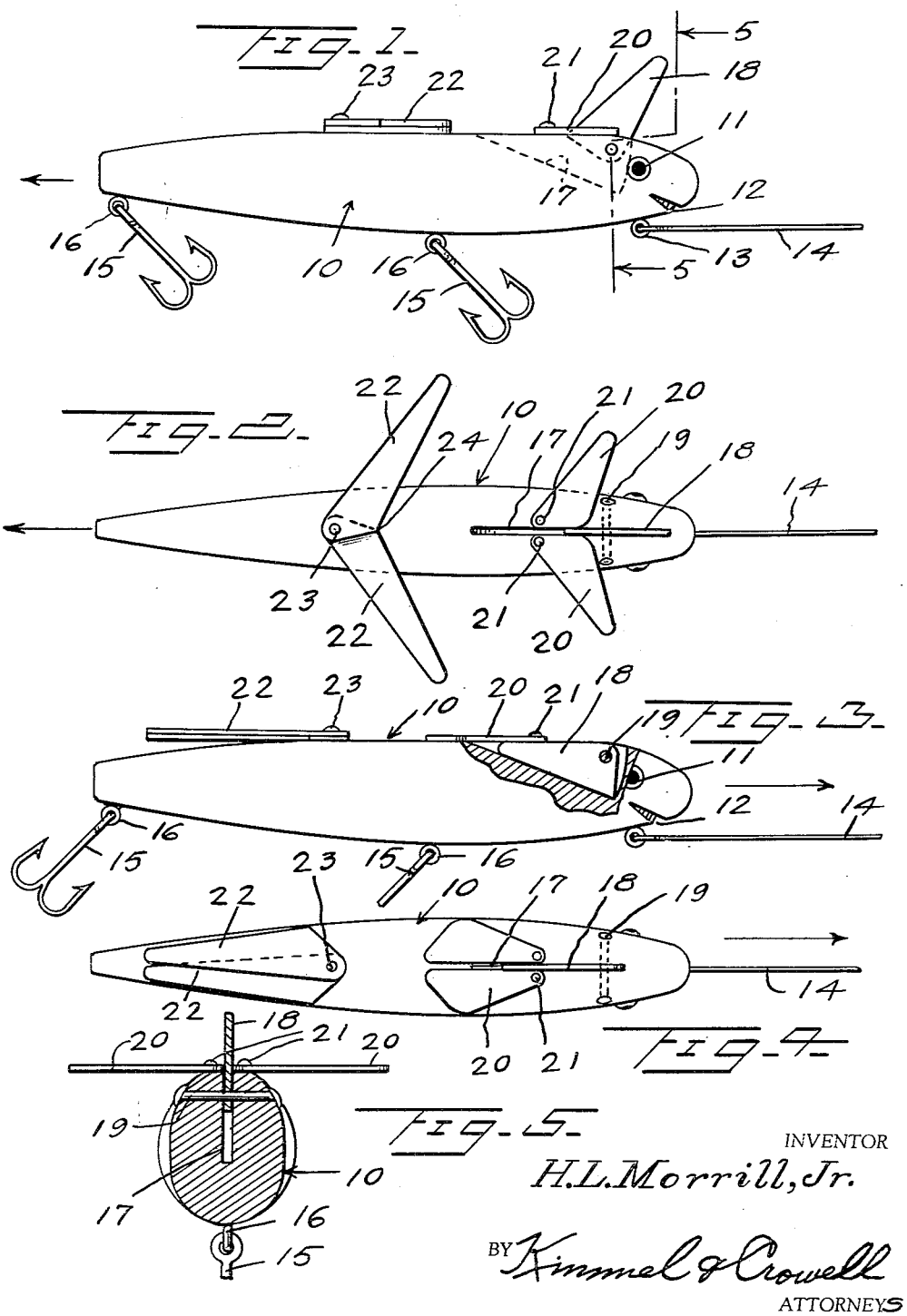
INVENTOR
H. L. Morrill, Jr.
BY Kimmel & Crowell
ATTORNEYS Aug. 28, 1956   H. L. MORRILL, JR   2,760,294
FISH LURE
Filed Sept. 22, 1954   2 Sheets-Sheet 2
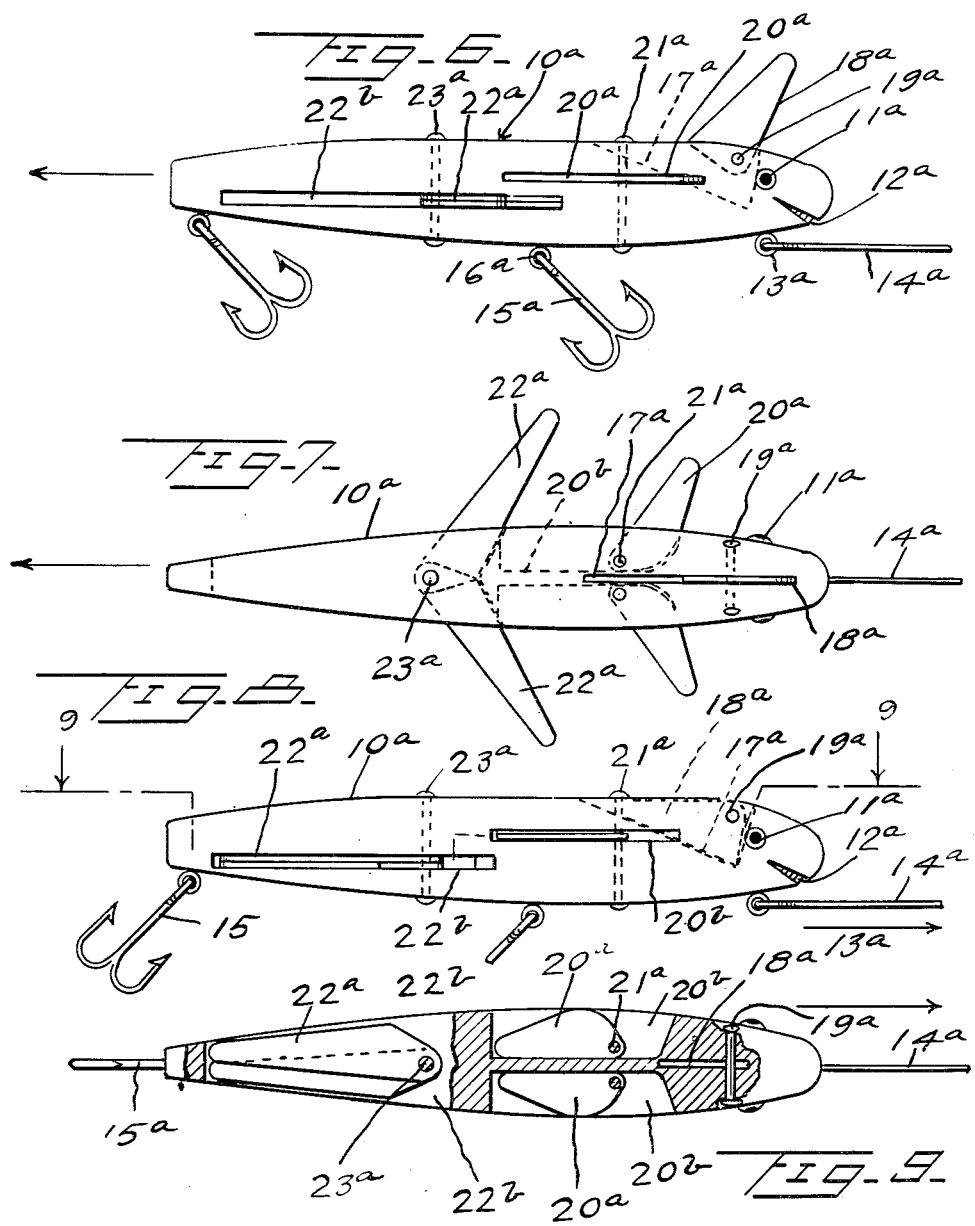
INVENTOR
*H. L. Morrill, Jr.*
BY *Kimmel & Crowell*
ATTORNEYS

United States Patent Office 2,760,294
Patented Aug. 28, 1956

2,760,294

FISH LURE

Harry L. Morrill, Jr., Atlanta, Ga.

Application September 22, 1954, Serial No. 457,623

5 Claims. (Cl. 43—42.45)

This invention relates to a fish lure and more particularly to a casting lure of the type adapted to be cast through the air to a suitable distance and then drawn toward the fisherman.

A primary object of the invention is the provision of such lure having means for stabilizing the same during the flight through the air, and consequently increasing the length of the cast as well as insuring directional stability.

An additional object of the invention is the provision of means whereby the stabilizing members are automatically retracted when the lure is drawn through the water toward the fisherman.

An additional object of the invention is the provision of means whereby the stabilizing members are automatically extended during casting and automatically retracted during trolling.

A further object of the invention is the provision of a device of this character which is sturdy and durable in construction, reliable and efficient in operation and relatively simple and inexpensive to manufacture and assemble.

Still other objects will in part be obvious and in part be pointed out hereinafter and shown in the accompanying drawings wherein there are disclosed preferred embodiments of this inventive concept.

In the drawings:

Figure 1 is a side elevational view of one form of lure embodying this invention, during casting, the fins or wings being shown in extended position;

Figure 2 is a top elevational view of the device in the position of Figure 1;

Figure 3 is a side elevational view, partially in section, showing the lure of Figure 1 as being trolled through the water with the fins or wings in retracted position;

Figure 4 is a top plan view of the device in the position shown in Figure 3;

Figure 5 is an enlarged sectional view taken substantially along the line 5—5 of Figure 1 as viewed in the direction indicated by the arrows;

Figure 6 is a side elevational view of a modified form of construction, shown in wing-extended position as during casting;

Figure 7 is a top plan view of the structure of Figure 6, certain concealed portions thereof being indicated in dotted lines;

Figure 8 is a side elevational view of the device of Figure 6 shown in wing-retracted position as during trolling; and Figure 9 is a sectional view taken substantially along the line 9—9 of Figure 8 as viewed in the direction indicated by the arrows.

Similar reference characters refer to similar parts throughout the several views of the drawings.

Having reference now to the structure shown in Figures 1 to 5 inclusive, there is generally indicated at 10 a lure body in simulation of a fish or the like, including at its front end simulated eyes 11 and mouth 12, and having a line-engaging eye 13 to which is adapted to be attached a line 14. Hooks of any suitable type 15 are secured to eyes 16 at suitable spaced intervals along the underside of the body.

Adjacent the front end of the body 10 is a vertical slot 17 of generally triangular configuration, within which is seated triangular fin or wing 18, the latter being pivotally connected as by means of a transversely extending pivot pin 19 adjacent the upper part of the body at the deepest portion of the slot.

Pivotally mounted on opposite sides of slot 17 are a pair of laterally extending wings 20, in the shape of substantially right angular triangles, the pivots 21 being disposed on opposite sides of slot 17, and adjacent the rearward end of each fin 20.

A second pair of triangular fins 22 are pivoted rearwardly of the fins 20 on a single centrally located pivot 23 in the upper side of the body, and extend in substantial parallelism to the fins 20.

From the foregoing the operation of the device should now be readily understandable. When the device is cast in the direction indicated by the arrows in Figure 1, inertia will cause the fins 20 and 22 to swing outwardly about their respective pivots 21 and 23 to the position disclosed in Figures 1 and 2. A suitable stop member 24 which may comprise a small lug or the like will limit the outward extension of wings or fins 22 to the extent shown, while the engagement of the edges of fins 20 with vertical fin 18, which is also moved to the position of Figure 1 by the inertia occasioned by casting, will limit the outward movement of fins 20. The upper edge of slot 17 will serve to retain the fin 18 in the position indicated.

When the limit of the cast is reached, and the line 14 reeled toward the fisherman, water resistance will cause the rearward pivoting of fins 18, 20 and 22 to the position shown in Figure 3, thus affording a substantially streamlined body without the outwardly extending fins or wings present when in casting position.

A somewhat similar construction is disclosed in Figures 6 to 10 inclusive, wherein a body 10a is provided with eyes 11a and mouth 12a, and a front eye 13a to which is adapted to be attached a line 14a. The body 10a also has hooks 15a secured to eyes 16a, a vertically disposed triangular slot 17a and a vertical fin 18a pivoted on a pivot 19a, all substantially identical in construction to those disclosed in the preceding modification.

Fins or wings 20a, identical in general configuration to the wings 20, are mounted on pivots 21a, and wings 22a are correspondingly mounted on a pivot 23a. However, in the modification of Figures 6 to 9 inclusive, suitable slots 20b in opposite sides of body 10b are adapted to receive the wings 20a therein in retracted position, rather than having the wings fold along the top of the body as disclosed in the foregoing modification. A similar slot 22b extending entirely through the body transversely is adapted for the folded reception of the wings 22a interiorly of the body. The use and operation of the device of this modification is substantially identical to that previously described with the exception that the wings or fins here fold interiorly of the body rather than along the upper surface thereof as in the foregoing modification.

From the foregoing it will now be seen that there is herein provided an improved fish lure, which accomplishes all of the objects of this invention, and others, including many advantages of great practical utility in facilitating the accuracy and distance of casting the lure.

As many embodiments may be made of this inventive concept and as many modifications may be made of the embodiment hereinbefore shown and described, it is to be understood that all matter herein is to be interpreted merely as illustrative and not in a limiting sense.

I claim:

1. In a fish lure, the combination of a body having a front end and a rear end, hooks connected to said body, a line connection adjacent said front end, a pair of wings, a pivot mounting each of said wings adjacent the front end of said body, a second pair of wings, and a pivot common to each of said second pair of wings mounting said second pair of wings to said body in rearwardly spaced relation to said first pair of wings, said wings being swingable to extended position upon rearward movement of said body and to retracted position upon forward movement of said body.

2. In a fish lure, the combination of a body having a front end and a rear end, hooks connected to said body, a line connection adjacent said front end, a pair of wings, a pivot mounting each of said wings adjacent the front end of said body, a second pair of wings, and a pivot common to each of said second pair of wings mounting said second pair of wings to said body in rearwardly spaced relation to said first pair of wings, said wings being swingable to extended position upon rearward movement of said body and to retracted position upon forward movement of said body, one of said wings lying in a plane perpendicular to the plane of the others of said wings.

3. In a fish lure, the combination of a body having a front end and a rear end, a pair of wings, a pivot mounting each of said wings adjacent the front end of said body, hooks connected to said body, a line connection adjacent said front end, a second pair of wings, a pivot common to each of said second pair of wings mounting said second pair of wings to said body in rearwardly spaced relation to said first pair of wings connected to said body, said wings being swingable to extended position upon rearward movement of said body and to retracted position upon forward movement of said body, one of said wings lying in a plane perpendicular to the plane of the others of said wings, said body being provided with a slot for the reception of said one of said wings.

4. In a fish lure, the combination of a body having a front end and a rear end, hooks connected to said body, a line connection adjacent said front end, a plurality of wings pivotally connected to said body, said wings being swingable to extended position upon rearward movement of said body, one of said wings lying in a plane perpendicular to the plane of the others of said wings, and said body being provided with slots for the reception of said wings.

5. In a fish lure, the combination of a body having a front end and a rear end, hooks connected to said body, a line connection adjacent said front end, and a plurality of wings pivotally connected to said body, said wings being swingable to extended position upon rearward movement of said body and to retracted position upon forward movement of said body, one of said wings lying in a plane perpendicular to the plane of the others of said wings, said others of said wings being pivoted to the exterior of said body and lying substantially flush therewith when in retracted position.

References Cited in the file of this patent
UNITED STATES PATENTS

| | | |
|---|---|---|
| 756,527 | Reynolds | Apr. 5, 1904 |
| 1,188,583 | Townsend | June 27, 1916 |
| 1,239,724 | Reimers | Sept. 11, 1917 |
| 1,923,623 | Hoage | Aug. 22, 1933 |
| 2,365,628 | Dory | Dec. 19, 1944 |